May 18, 1965     M. J. GREAVES ETAL     3,184,037
RECIPROCABLE CONVEYOR Filed June 12, 1961     7 Sheets-Sheet 1

INVENTORS
MELVIN J. GREAVES,
ALFRED W. BABB,
& FRED J. R. DICKS
BY
Bosworth, Sessions
Herrstrom & Knowles
ATTORNEYS 3,184,037
RECIPROCABLE CONVEYOR
Melvin J. Greaves and Alfred W. Babb, Cleveland, and Fred J. R. Dicks, Chardon, Ohio, assignors to Arthur G. McKee & Company, Cleveland, Ohio, a corporation of Delaware
Filed June 12, 1961, Ser. No. 116,424
17 Claims. (Cl. 198—89)

This invention relates to conveyor systems, and more particularly to conveyor systems for handling and discharging loose flowable solid material such as balls, pellets, granules or particles, in such manner as to facilitate the formation of such materials in layers of substantially uniform thickness.

While the invention may be advantageously employed for various purposes, it will be described as employed in the manufacture of iron ore pellets which are heated on a conventional traveling grate type of pelletizing apparatus, since in such use it provides exceptional benefits.

Such pellets are produced by mixing with water finely divided ore, ore concentrate, flue dust, or other metal-bearing material, either alone or with binding material, fuel, or other substances, to obtain a moist mud-like material, and then forming balls of such material. To as great an extent as possible, these balls are of a uniform desired size. Pelletizing, involving proper drying and heating of these balls will remove the moisture from them and harden them so that they may be thereafter handled and stored by conventional ore handling apparatus and constitute a highly desirable charge material for blast furnaces or other smelting apparatus.

Pelletizing on the conventional pelletizing machine of the traveling grate type involves depositing the balls on the grate to form a layer or bed of predetemined thickness or depth, and then treating the balls in the layer by drying, preheating, igniting, burning, and cooling or other steps. All of these steps require that air or other gas be passed through the bed, either by downdraft or updraft.

In proper pelletizing, it is extremely important that the permeability of the bed, and the flow of air or other gas through the bed be highly uniform at each fixed point along the length of the pelletizing machine for a given type of balls and given speed of grate, since these factors play an extremely important part in determining the uniformity of the various treating conditions to which the balls are subjected as they travel along the machine. Otherwise, the treating conditions will not be uniform, with resultant production of undesirably varying characteristics and properties.

Assuming that the balls being pelletized are of suitably uniform size and composition, the desired uniform permeability of bed and flow of gases can only be achieved if the bed depth or thickness of the layer of balls on the traveling grate is constant at each fixed treating station along the length of the machine. This means that, for a given speed of travel of the grate, the balls must initially be deposited on the grate in a layer or bed which is of constant highly uniform predetermined thickness transversely and longitudinally of the grate in the vicinity of the location at which the balls are deposited on the belt.

The problem of obtaining such high uniformity of bed thickness is complicated by the facts that the thickness of the bed should be readily adjustable by manual or automated control means to compensate for changes in treatment conditions or in ball characteristics or types, that the apparatus for depositing the balls on the grate should operate for long periods with little attention or maintenance, and that the apparatus for depositing the balls should provide the desired uniformity of bed depth even though the balls may be supplied to such apparatus at considerably varying rates.

Although various types of apparatus have been proposed and used to deposit balls on the traveling grate, none have been completely satisfactory, to the best of our knowledge. In general, this lack has arisen either because the prior apparatus did not deposit the balls in a layer of sufficient uniformity, or because the apparatus could not be readily adjusted when necessary, or because it was so complicated and required so much maintenance that it could not operate satisfactorily for the desired long periods of time, or for combinations of these reasons.

It is an object of the invention to provide apparatus for handling and discharging loose flowable solid material, such as balls to be pelletized, in such manner as to facilitate the formation of a layer of substantially uniform thickness. It is another object of the invention to conveyor, the material-carry upperorsrsv
provide apparatus comprising an extensible belt-type conveyor, the material-carrying upper run of which terminates in a discharge end which reciprocates longitudinally of such conveyor and transversely of and above the material-carrying upper run of a lower conveyor to deposit loose flowable material on said last mentioned lower conveyor. Another object is the provision of such apparatus in which the speed at which such discharge end reverses may be adjusted, and in which the length of reciprocation of such discharge end is adjustable. A further object is the provision of such an apparatus in which the last mentioned conveyor travels constantly, and the extensible conveyor discharges material onto said first mentioned conveyor only during the withdrawal stroke of the discharge end of the extensible conveyor.

The above and other objects of the invention will appear from the following descriptions of two embodiments thereof, reference being made to the accompanying drawings in which.

Figure 1:
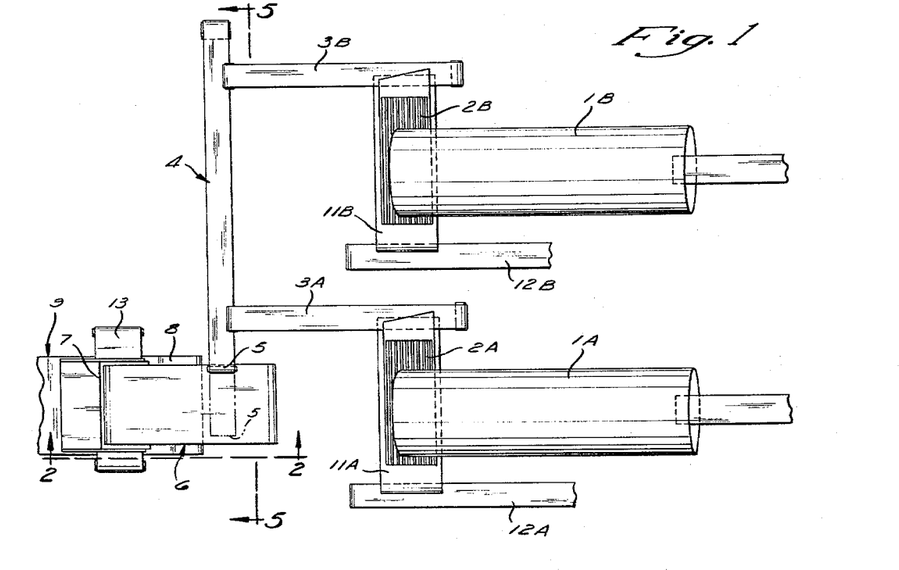
FIGURE 1 is a somewhat diagrammatic plan view of a portion of a pelletizing plant embodying two balling drums discharging balls to be pelletized onto vibrating screens, thence onto two conveyors discharging on one form of apparatus embodying the invention which discharges the balls onto a traveling grate in a layer of highly uniform thickness.
Figure 2:
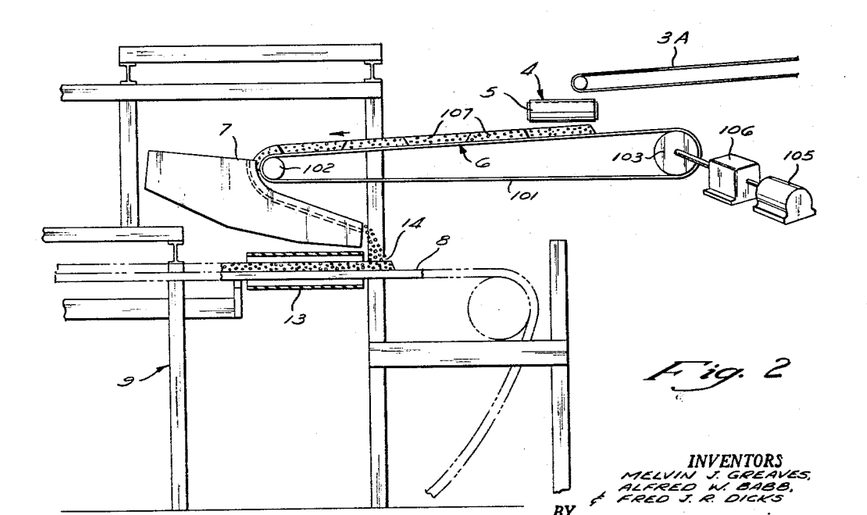
FIGURE 2 is a diagrammatic elevation, to an enlarged scale, along line 2—2 of FIGURE 1, showing the deposition of the balls in a layer of uniform thickness on the traveling grate.
Figures 3, 4, 12, 13, 14:
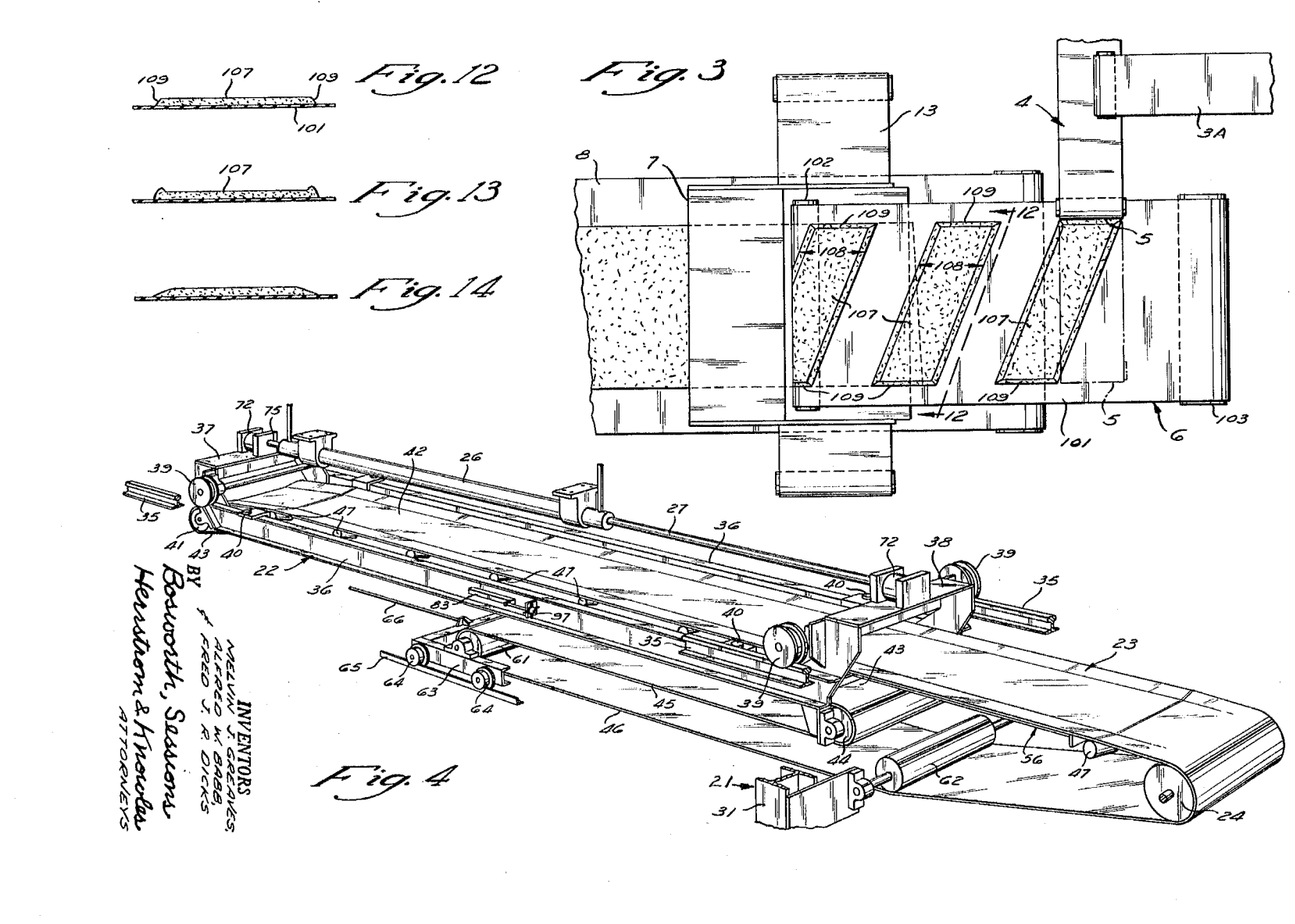
FIGURE 3 is a plan of the apparatus of FIGURE 2, showing how the balls are deposited by the reciprocable extensible conveyor on a lower receiving conveyor and thence onto a vibratory screen from which they pass to the grate.
FIGURE 4 is a perspective showing an extensible conveyor with a reciprocable discharge end included in the present invention, parts being broken away to clarify the construction.
FIGURE 12 is a section, along line 12—12 of FIGURE 3, showing the preferred shape of the ends of the ridges of material deposited by the belt of the extensible conveyor.
FIGURE 13 shows another possible end shape.
FIGURE 14 shows still another possible end shape.

In FIGURES 1, 2, and 3, reference numerals 1A and 1B indicate balling drums of known type which form a mixture of ore concentrate, binding material, water, and fuel if desired, into substantially spherical balls. The balls discharge from the drums onto vibratory screens 2A and 2B from which the balls over a predetermined size pass onto supply conveyors 3A and 3B. These conveyors 3A and 3B move constantly during operation of the balling drums and deposit the balls carried by them on the extensible conveyor 4 forming part of the apparatus embodying the invention, the balls being deposited in a thin layer on conveyor 4; the reciprocatory discharge end 5 of such extensible conveyor 4 deposits the balls in a predetermined pattern on a constantly moving conveyor 6 also included in apparatus of the invention and passing transversely under the path of reciprocation of the discharge end 5 of conveyor 4. Such conveyor 6 in the illustrated embodiment discharges the balls onto a vibratory screen 7 which deposits the balls larger than a predetermined size on the diagrammatically indicated traveling grate 8 of the pelletizing machine generally indicated by reference numeral 9, on which the balls are heated and converted into hardened pellets.

The undersize balls passing through the vibratory screens 2A and 2B drop onto conveyors 11A and 11B, from which they are returned by conveyors 12A and 12B and associated apparatus into the balling drums from which they came. Similarly, the undersize balls passing through the vibratory screen 7 drop onto a conveyor 13 which, in cooperation with other conventional means not shown, returns such balls to the interiors of one or both of the balling drums 1A and 1B. The balls which do not pass through the vibratory screen 7 are deposited on the traveling grate 8 in a layer 14 which is of highly uniform thickness and provides the advantages indicated above.

The apparatus embodying the invention, which comprises conveyors 4 and 6 and their associated equipment, is shown in more detail in FIGURES 4 to 11 inclusive. In such apparatus the conveyor 4 comprises a stationary frame structure, generally indicated by reference numeral 21 (see FIGURES 4 to 8) which supports a movable carriage 22 for horizontal reciprocatory movement, the carriage being shown in FIGURE 5 in full lines in its retracted position and in broken lines in its extended position. The frame structure 21 and the reciprocable movable carriage 22 cooperate to carry an endless conveyor belt 23, which is shown as a thin, relatively wide endless strip of fabric-reinforced rubber or the like. The belt is supported and arranged in such manner that as the movable carriage 22 reciprocates the upper load-carrying run of the belt 23 increases and decreases in length and the discharge end 5 of the upper belt run reciprocates transversely across the load-carrying upper belt run of the conveyor 6, as shown to advantage in FIGURES 3, 5 and 6; meanwhile, the length of belt in the lower run also changes to compensate for the changes in the length of belt in the upper run. The belt 23 is continuously positively driven by a driving pulley 24 which is rotated by the suitable power source such as a speed reducer 25 driven by a motor 26. The reciprocable movable carriage 22 is positively moved between its extended and retracted position by a hydraulic cylinder 26 having a double ended piston rod 27 the opposite ends of which are connected to the opposite ends of the movable carriage 22. The hydraulic cylinder 26 is supplied with hydraulic fluid under pressure from a suitable source such as pump 28 operated by motor 29.

The stationary frame 21 comprises upwardly extending side members 31, 32 fixed to suitable cross members 33. As shown advantageously in FIGURES 4, 7 and 8, the upright side members 31 rigidly support, through suitable brackets 34, a pair of spaced parallel longitudinally and horizontally extending rails 35 on which the reciprocable carriage 22 travels.

The carriage 22 comprises a rigid frame including spaced parallel side members 36 and front and rear raised cross member 37 and 38. The opposite ends of carriage 22 rotatably carry spaced, double-flanged wheels 39 which travel on and along the tracks 35 and thus support the carriage 22. Preferably, the side members 36 of the carriage 22, near their ends also carry rollers 40, rotatable about vertical axes, in such positions that they contact the inner surfaces of the tracks 35 to guide the carriage 22 laterally more accurately than is possible by the flanged wheels 39 alone.

At its forward or discharge end, the movable carriage 22 carries a roller 41 rotatable about a horizontal axis which extends at right angles to the direction of travel of the moving belt 23 and is fixed relatively to the carriage in such position that the upper surface of the roller 41 supports the upper run 42 of belt 23 and conducts the belt to its lower run 43.

Figures 7, 8:
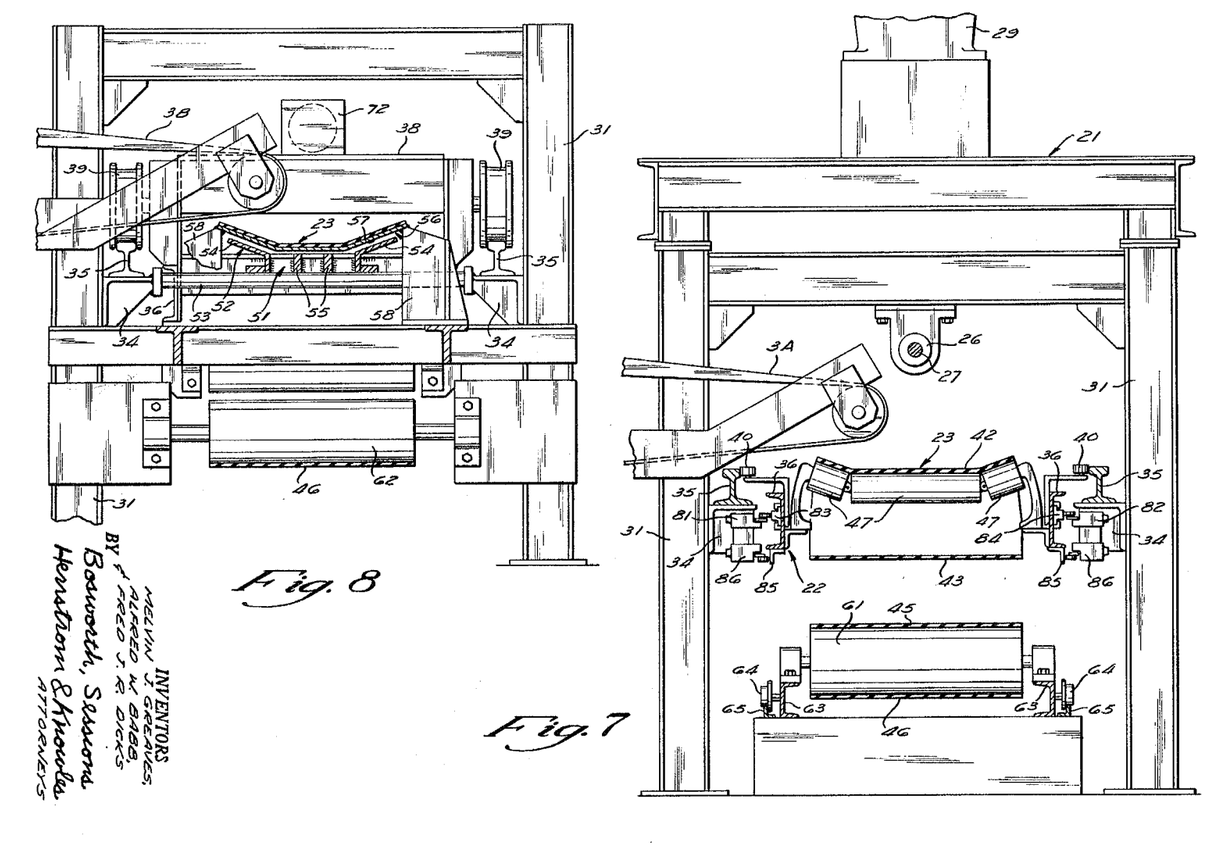
FIGURE 7 is a section along line 7—7 of FIGURE 5.
FIGURE 8 is a section along line 8—8 of FIGURE 5.

Another roller 44 is rotatably supported at the rear end of carriage 22 about an axis fixed on the carriage and parallel to the axis of roller 41, located so that the upper surface of roller 44 supports the lower run 43 of the belt and reverses it so it passes into the upper run 45 and thence into the lower run 46 of the compensating portion of the lower run of belt 23, as is shown to advantage in FIGURE 4. Carriage 22 also carries spaced idler rollers 47, 48 to support the upper and lower runs 42 and 43 of the belt on the carriage. The idler rollers 47 carrying the upper run 42 of the belt, preferably are segmented as shown in FIGURE 7 to cause the upper belt run to define a shallow trough which effectively carries the balls deposited on the belt without spillage over the belt sides.

Figures 5, 6:
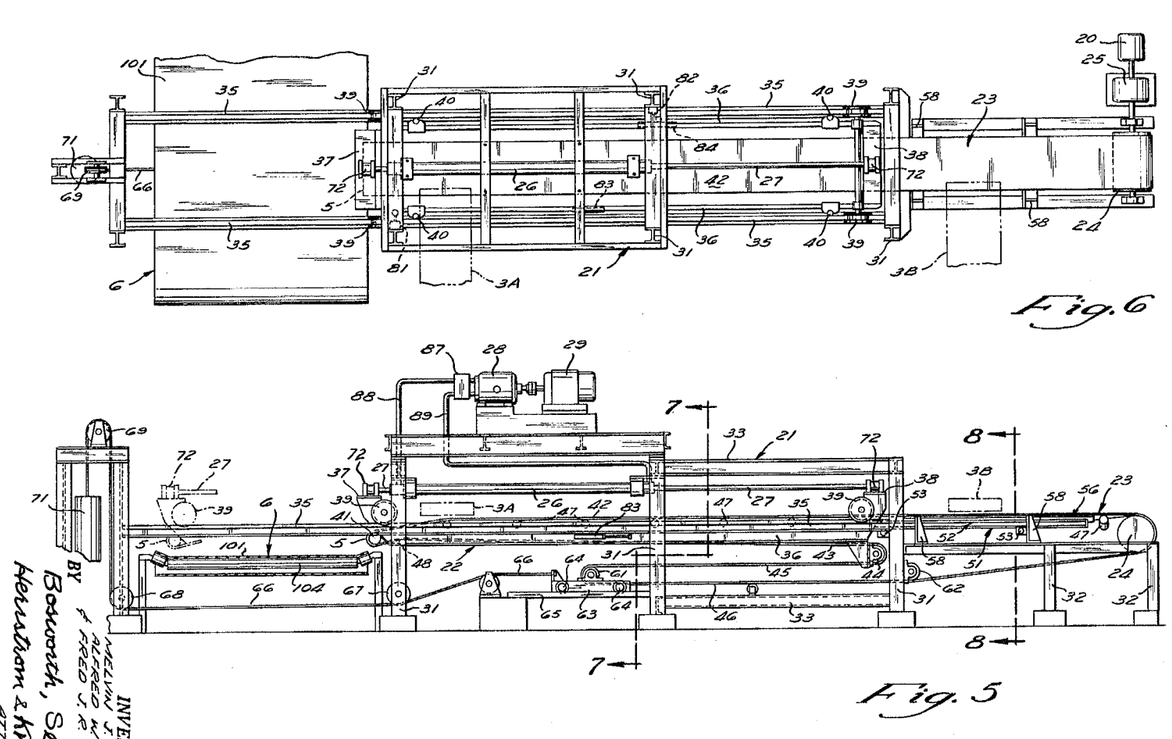
FIGURE 5 is an elevation from line 5—5 of FIGURE 1, showing the extensible conveyor and the lower receiving conveyor of the apparatus illustrated as embodying the invention.
FIGURE 6 is a plan view of the apparatus of FIGURE 5, the hydraulic pump and drive motor being omitted for clearness.

It will be apparent that as the carriage 22 reciprocates longitudinally of the stationary frame 21, the length of the upper load-carrying run 42 of the belt increases and decreases between the rear end of carriage 22 and the drive roller 24 mounted on the stationary frame 21. To provide adequate support for this portion of the load-carrying run of the belt, the illustrated apparatus includes a telescoping supporting means 51. As shown in FIGURES 5 and 8, such supporting means comprises a generally channel-shaped movable supporting member 52 the forward end of which is fixed to the rear end of carriage 22 and the remainder of which is supported by rotatable rollers 53 carried by stationary frame 21; member 52 is formed of longitudinally extending side plates 54 and bottom bars 55 shaped and arranged to define an upwardly open belt-supporting channel, as shown in FIGURE 8. A stationary belt-supporting member 56 also forming part of the telescoping supporting means 51, is mounted on stationary frame member 21 above the movable member 52. As shown to advantage in FIGURES 5 and 8, this stationary member 56 comprises a plate 57 of upwardly open channel shaped cross section rigidly supported by the brackets 58 fixed to the rear portion of the frame member 21. Therefore, as the carriage 22 reciprocates, the movable member 52 fixed to it reciprocates under the stationary member 56; these members thus cooperate to provide a continuous extensible support for substantially all of the portion of the upper load carrying run of the belt extending between drive roller 24 to the rear end of the carriage 22.

As the carriage 22 moves from its retracted position shown in full lines in FIGURE 5 to its extended position shown in broken lines in the same figure and then back to its retracted position, the length of the upper run 42 correspondingly increases and decreases and compensating changes in belt length are made in the lower run of the belt by the means shown to advantage in FIGURES 4 and 5. Such means includes a substantially stationary tension roller 61 toward which the portion 45 of the lower run of the belt passes from rear roller 44 of the carriage 22 and from which the portion 46 of the lower belt run travels back to the drive roller 24, preferably over a guide roller 62.

While roller 61 may be stationary, in practice it is desirable that it act as a tension roller to maintain a substantially constant tension in the belt and to compensate for changes in belt length arising from stretch, temperature, humidity, etc. In the illustrated embodiment, therefore, roller 61 is rotatably mounted on a movable carriage 63 having wheels 64 which support it for movement along rails 65 supported from the floor. A cable 66 is fixed to an end of carriage 63 to pull the carriage against the tension of the belt 23; this cable passes over suitable guide pulleys 67, 68 and 69 to suspend a counterweight 71, pulley 69 being at an elevated location so that the suspended weight 71 can maintain a biasing force on the roller 61 and a desired tension in the belt 23.

In the illustrated embodiment, the piston rod 27 of actuating cylinder 26 is connected at each of its ends to the carriage 22 by connecting means which permits some restrained relative movement between the piston rod and carriage to reduce deceleration and acceleration forces at each end of the carriage stroke, and which preferably insures that the piston rod is only under tension when it moves the carriage. Such means, which is shown to advantage in FIGURES 9 and 10, comprises two identical dash-pots 72 fixed to the cross members 37, 38 at the ends of carriage 22, to each of which dash-pots one of the ends of piston rod 27 is connected.

Figure 9:
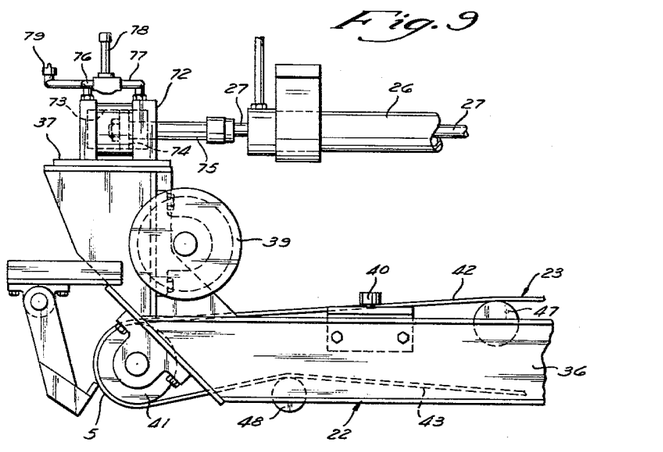
FIGURE 9 is a detail to a larger scale of one end of the reciprocable carriage of the extensible conveyor, showing the dash-pot connecting the carriage to the piston rod which moves such carriage.

As is apparent from FIGURE 9, which shows the dash-pot 72 connected to cross member 37 at the forward or discharge end of carriage 22, the dash-pot comprises a cylinder chamber 73 in which is slidably mounted a closely fitting piston 74 having a rod 75 connected to the adjacent end of the piston rod 27 of the actuating cylinder 26 in such manner as to permit relatively small transverse movement but no axial movement of the piston rods 27 and 75 relatively to each other. The spaces in the cylinder chamber 73 on each side of the piston 74 communicate through conduits 76 and 77 and the adjustable valve 78. Cylinder chamber 73 is substantially filled with a suitable fluid, such as oil; preferably, a filler cap 79 is provided through which the liquid can be introduced to initially fill the dash-pot, and to replenish the liquid from time to time if necessary.

The adjustable valve 78 preferably is of a type which permits the fluid to flow quite rapidly into the piston rod end of the cylinder chamber 73 through pipes 76, 77 and valve 78, from the blind end of the cylinder chamber on the other side of the piston 74, that is, from the portion of the cylinder chamber 73 to the left of the piston to the portion of the chamber to the right of the piston in FIGURE 9; and which valve 78 permits the fluid to flow at a controlled lower rate in the reverse direction, that is from the portion of the cylinder chamber 73 at the right of the piston 74 to the portion of the chamber 73 at the left of the piston in FIGURE 9. Preferably, the valve 78 is adjustable to control such lower rate of flow, while permitting free flow of fluid in the other direction.

The movement of the pistons 74 in the dash-pot cylinder chambers 73 against the resistance of the fluid absorbs a substantial portion of the kinetic energy of the carriage, and reduces the deceleration and acceleration forces to which the necessarily weighty carriage is subjected, while still permitting the desired rapid reversals of movement of the carriage.

Figures 10, 11:
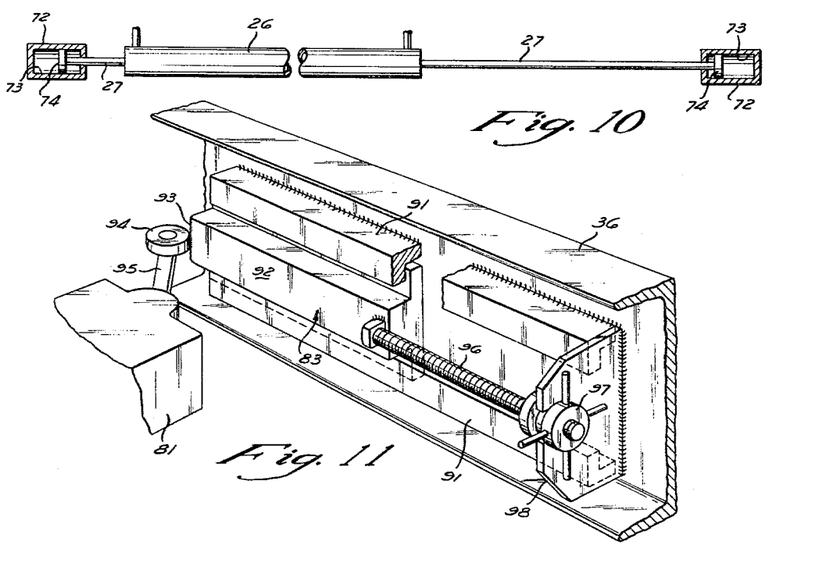
FIGURE 10 is a diagrammatic view showing how the dash-pot pistons are related to each and to such piston rod.
FIGURE 11 is a detail to a larger scale of one of the cams which engages a limit switch to reverse the carriage at one end of its stroke, the cam being adjustable to control the length and position of the carriage stroke.

Preferably, as is diagrammatically shown in FIGURE 10, the parts are so proportioned and located that in each dash-pot 72 the maximum distance which can occur between the piston rod end of the dash-pot cylinder chamber 73 and any portion of piston 74 which can contact such end is substantially less than the maximum distance which can occur between the other or blind end of the dash-pot cylinder chamber 73 and any portion of the other side of the piston which could contact such end. Under these circumstances, there is no possibility that either of the pistons 74 can contact the blind end of its dash-pot, so that rod 27 of actuating cylinder 26 cannot ever be under compression. This is extremely important, since elevated temperatures arising from high ambient temperatures or from heat of operation can result in substantial increases in the length of the long piston rod 27, which increases might otherwise cause the development of compressive forces which could bow or jam the piston rod 27.

In operation of the portion of the apparatus shown in FIGURE 9, when the piston rod 27 of the actuating cylinder 26 is moving to the left and toward the dash-pot 72 mounted on the front end of carriage 22, the piston 74 cannot contact the blind end of the dash-pot and there is little resistance to movement of the piston 74 in the same direction, since the liquid can pass quite freely through pipes 76, 77 and valve 78 from the left end to the other end of the cylinder chamber. In such case, the piston rod 27 is not under appreciable compression and does not exert a pushing force on the carriage. When, however, the carriage 22 has reached the end of its extended stroke as shown in broken lines in FIGURE 5, and the direction of travel of the actuating piston rod 27 is reversed so it moves to the right in FIGURE 9, the piston 74 exerts pressure on the fluid in the right end portion of the cylinder chamber 73, causing the fluid to flow to the left end portion against resistance provided by valve 78. Consequently, the piston rod 27 connected to the dash-pot 72 of FIGURE 9 is under tension and exerts only a pulling force as it draws the carriage 22 toward its retracted position to the right in FIGURES 5 and 9. The dash-pot 72 at the other end of carriage 22 operates similarly to maintain the piston rod 27 under tension as the carriage moves to the left in FIGURE 5.

In the illustrated apparatus, means are also provided for automatically reversing the movement of piston rod 27 of actuating cylinder 26 when the carriage 22 reaches each end of the desired reciprocatory stroke. Such means comprises limit switches 81, 82 fixed to opposite sides of stationary frame 21 and adapted to be respectively engaged by cam members 83, 84 fixed to opposite sides of the movable carriage 22. In the illustrated apparatus, the limit switch 81 is engaged by cam member 83 when the carriage reaches its extended position, while limit switch 82 on the other side of the apparatus is engaged by cam member 84 when the carriage reaches its retracted position. On each side, moreover, the carriage 22 is provided with suitable fixed stop members 85 adapted to engage overrunning limit switches 86, to insure that the carriage 22 will be halted in the event of malfunction of either the limit switches 81 or 82 or their cooperating cam members. The above described limit switches 81, 82 and 86, if desired, are connected through suitable conventional circuit means, not shown, to actuate conventional valve apparatus 87 to control the flow of hydraulic fluid from hydraulic pump 28 through pipes 88 and 89 to the opposite ends of the actuating cylinder 26 and cause the desired reciprocation of the movable carriage 22. Preferably, the valve apparatus 87 is also adjustable so that it can vary the speed of travel of the movable carriage in either direction. Of course, other speed adjustment means may be employed, such as suitable means embodied in the hydraulic pump 28 to control the rate of fluid flow, or means for controlling the speed of motor 29.

Preferably, each of cam members 83 and 84 is adjustable to vary the position longitudinally of the carriage 22 at which it engages its respective limit switch 81 or 82, so that the length or location of the reciprocatory stroke of the carriage may be adjusted relatively to conveyor 6. One preferred means for this purpose is apparent from FIGURE 11, showing a perspective elevation of the cam member 83 as it engages limit switch 81 when the carriage 22 reaches the end of its advance stroke. The cam member 83 comprises two longitudinal guide members 91 rigidly fixed, as by welding, to the outer surface of side member 36 of carriage 22. These guide members slidably support an elongated cam 92 having at one end a curved cam surface 93 adapted to engage a roller 94 mounted on an arm 95 of limit switch 81. The position of cam 92 longitudinally of carriage 22 is located by a threaded stud 96 rigidly fixed, as by welding, to the other end of cam 92 and threaded through the actuating member 97 which is rotatably mounted in bracket 98 fixed to carriage 22. By rotation of member 97, the location of cam surface 93 longitudinally of the carriage 22 can be adjusted. The cam member 84 on the other side of the apparatus is similar except that its cam surface faces in the opposite direction. It is apparent that by suitable adjustment of the positions of the cam surfaces of the cam members relatively to the carriage 22, the length of the reciprocatory stroke of the carriage as well as the transverse location of such stroke relatively to the conveyor 6 may be readily adjusted.

The conveyor 6 extending transversely under the reciprocable discharge end 5 of the extensible conveyor 4 may be of any suitable type. That shown comprises a wide, thin, endless belt 101, of impervious fabric-reinforced rubber or the like, which travels over and is supported by suitable end rollers 102 and 103 (FIGURES 2 and 3) and suitable idler rollers 104 (FIG. 5). The idler rollers 104 which support the top or load-carrying run of the belt 101 preferably are segmented to cause the upper run of the belt to assume a trough or channel shape which effectively carries the material deposited thereon with no spillage. The belt 101 is positively driven by a suitable source of power, such as the variable speed motor 105 driving end roller 103 through speed reducer 106 as shown diagrammatically in FIGURE 2.

In the preferred mode of operation of the apparatus illustrated in FIGURES 3 to 11 inclusive, the conveyor 6 is operated so that the upper run of its belt 101 moves continuously at a suitable uniform linear speed. The extensible conveyor 4 also operates so that the upper or load-carrying run 42 of its belt 23 travels at a suitable uniform linear speed toward the reciprocable discharge end 5 of the belt. The carriage 22 is preferably reciprocated in each direction at the same linear speed as the speed of the upper belt run. Consequently, as the carriage moves from its retracted to its extended position, the discharge end 5 of the upper run of belt 23 moves at the same speed as does the belt in the upper run, the roller 41 at the front of carriage 22 does not rotate, and no material is discharged over such end 5 onto the lower conveyor 6. However, when the carriage 22 moves from its extended to its retracted position, the length of the upper run 42 of the belt 23 shortens, the end roller 41 rotates, and the material on the upper run of belt 23 passes over its discharge end 5 and is deposited on the upper run of belt 101 of conveyor 6. Therefore, in this preferred method of operation, material is deposited on the conveyor 6 only on the retraction stroke of carriage 22. The increase and decrease in length of the upper run 42 of the belt is compensated for by the decrease and increase in length of the portion 45 of the lower run of the belt 23.

The material, such as the balls, discharged over the discharge end 5 of extensible conveyor 4 during its retraction stroke onto the upper run of continuous moving belt 101 of conveyor 6 is arranged on such belt in spaced, flat-topped parallel piles or ridges 107 extending angularly transversely of belt 101, as shown in FIGURES 2 and 3. The width 108 of each of the ridges 107 is substantially equal to the width of the material on the extensible conveyor 4 which is approximately the same as the width of the belt 23. The amount by which the ends 109 of each ridge are offset in the direction of travel of conveyor 6 depends on the speed of travel of the upper run of conveyor 6. In the illustrated embodiment, this speed is such that the ends 109 of each ridge are offset by approximately the width of the ridge, which means that during each retraction stroke of the discharge end 5 of conveyor 4, the lower conveyor travels approximately the width of belt 23 on conveyor 4. The speed of the lower conveyor, however, can be either greater or less in relation to the speed of reciprocation of the extensible conveyor 4.

The ridges shown in FIGURES 2 and 3 have ends 109 shaped as shown in FIGURE 12. However, by suitable adjustment of the acceleration or deceleration by means of the valve apparatus 87, it is possible to achieve other end configurations of the ridges, such as those shown in FIGURES 13 and 14.

Since the parallel ridges on the upper run of belt 101 of conveyor 6 do not extend at right angles to the direction of travel of the conveyor, the material on conveyor 6 does not discharge abruptly onto the vibratory screen 7. Rather, as is apparent from FIGURE 3, the discharge from each ridge 107 begins with a trickle of material at one side of the screen 7, and increase in width and magnitude as the ridge moves over the discharge end of the conveyor 6, finally diminishing to a trickle of material at the other side of screen 7, the cycle being repeated as each succeeding ridge 107 of material moves over the discharge end of conveyor 6. Consequently, the material has a pulsating discharge from conveyor 6 onto screen 7, the period of the pulsations being substantially uniform so long as substantially the same amount of material is deposited on conveyor 6 during each retraction stroke of conveyor 4. The discharge can be a substantially continuous pulsating discharge as occurs in the illustrated embodiment since the ends of the inclined ridges overlap as shown in FIGURE 3, or it can be made up of discontinuous pulses if the ends of the inclined ridges do not overlap, as would occur if conveyor 6 moved more rapidly relatively to the reciprocations of the conveyor 4.

Such pulsating discharge cooperates effectively with the vibratory action of screen 7 to screen out undersized balls, and to form on the traveling grate 8 a layer 14 of balls of highly uniform thickness, as shown in FIGURE 2.

Since the extensible conveyor 4 lays down parallel ridges 107 of material in a direction inclined to the direction of travel of conveyor 6, and since conveyor 6 discharges the material in pulsations on screen 7, the effects of irregularities in the amount of material deposited on the extensible conveyor 4 are largely minimized; even substantial irregularities in the rate of deposit of material on conveyor 4 result in little if any variation in the thickness of the layer 14 deposited by screen 7 on the traveling grate 8. Consequently, the above described apparatus provides on the traveling grate a bed or layer 14 of highly uniform thickness and permeability, which promotes uniform drying, preheating, ignition, burning, and cooling of the balls, with resultant production of pellets of a high degree of uniformity of composition and other characteristics. Comparable uniformity of treatment and product characteristics are achieved even if the extensible belt 4 receives balls from two or more balling mills, since the reciprocatory action of conveyor 4 and the pulsating discharge of conveyor 6 cause thorough admixing of the balls emanating from the several sources.

Although in the preferred method of operation described above the discharge end of the extensible conveyor 4 is advanced across conveyor 6 at the speed of travel of the upper run of the belt and is retracted at the same speed so that material is discharged only during the retraction stroke of the extensible conveyor, it is apparent that by suitable adjustment of the operation, other discharge cycles may be employed. For example, by suitable correlation of the speeds of the upper run of belt 23 and the movement of the carriage 22, it is possible to discharge material from the upper run of belt 22 on both the extension and retraction strokes of the discharge end of the conveyor 4, in which case V-shaped ridges of material will be deposited on conveyor 6. Moreover, by suitable adjustment of the cam members 83 and 84, the length or position of the ridges on the conveyor 6 can be changed within the limits of the adjustment provided by such members.

Figures 16, 19:
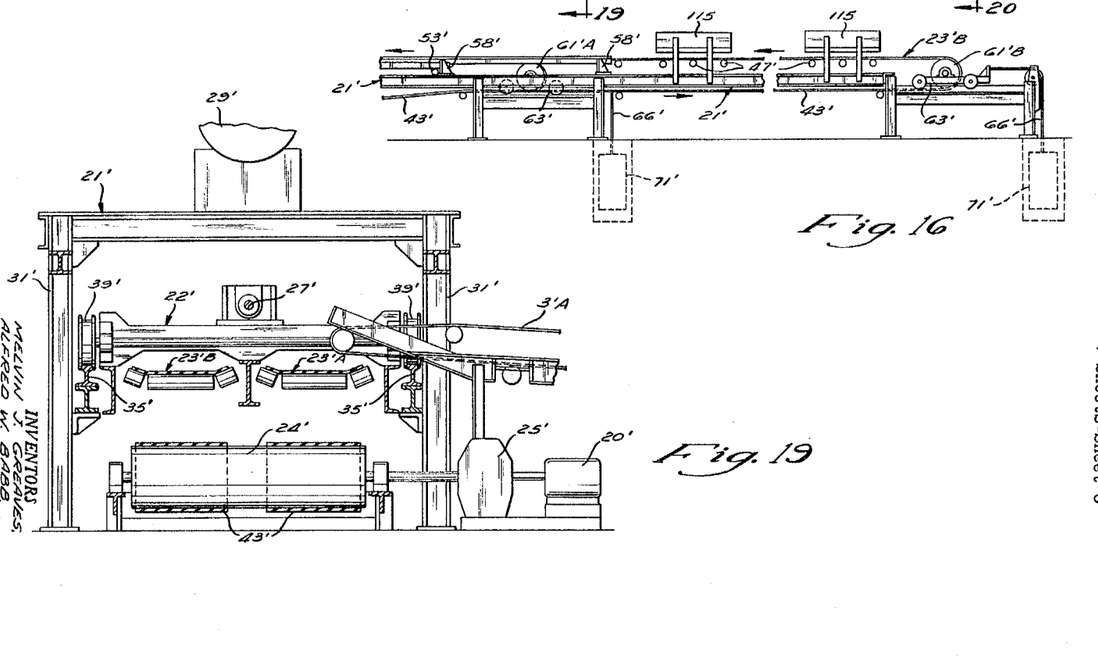
FIGURE 19 is a section along line 19—19 of FIGURE 15.
Figure 17:
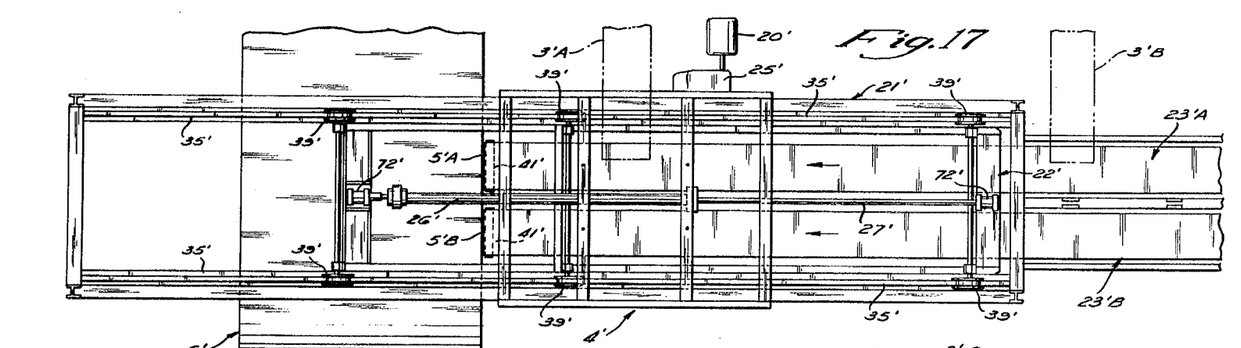
FIGURES 17 and 18 somewhat diagrammatically show a plan of the apparatus of FIGURES 15 and 16.
Figures 18, 20:
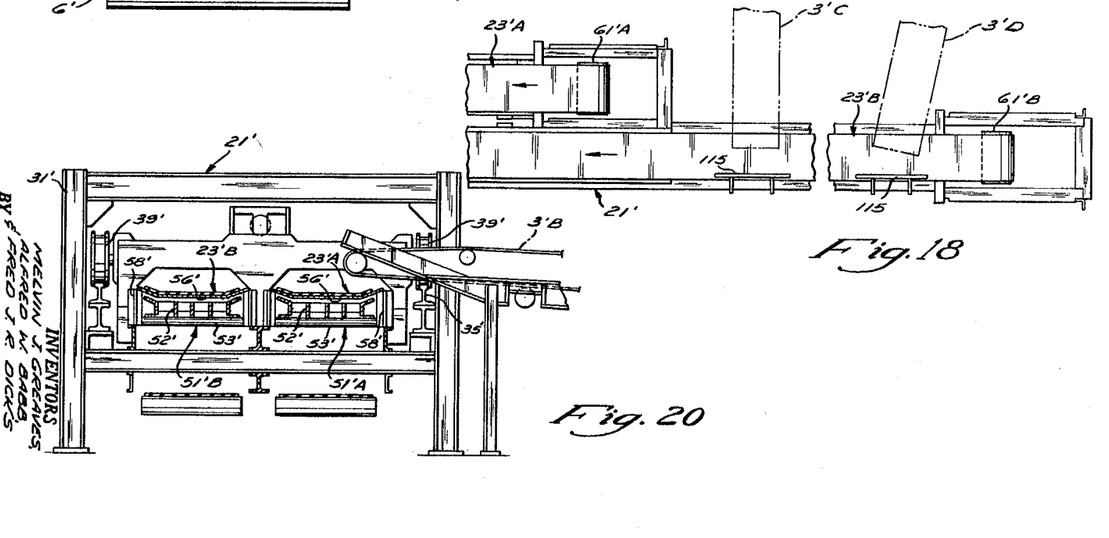
FIGURE 20 is a section along line 20—20 of FIGURE 15.

In the embodiment of FIGURES 17 to 20 inclusive, balls to be pelletized, originating in balling drums not shown, are deposited by four conveyors 3'A, 3'B, 3'C and 3'D on an extensible conveyor 4' having two continuously moving side-by-side extensible endless conveyor belts 23'A and 23'B, both of which are supported in part by a single reciprocable movable carriage 22' common to both. Two of the supply conveyors 3'A and 3'B discharge onto the conveyor belt 23'A, while the other two supply conveyors 3'C and 3'D discharge onto conveyor 23'B the rear portion of which is longer than the rear portion of belt 23'A in this embodiment to permit all four supply conveyors to supply the apparatus from the same side, as shown in FIGURES 17 and 18. The reciprocable carriage 22' supports the belts 23'A and 23'B, similar to the way belt 23 is supported in the previous embodiment, so that the upper run of each belt increases and decreases in length, and so that the belts 23'A and 23'B respectively have reciprocatory discharge ends 5'A and 5'B which move in unison and deposit the balls carried by the upper runs of these conveyors in a predetermined pattern on a constantly moving conveyor 6'. Conveyor 6' also forms part of the apparatus embodying the invention and has an upper run which is disposed below and travels transversely, and preferably at right angles, to the direction of travel and reciprocation of the extensible conveyor belts 23'A and 23'B. As in the previous embodiment, the conveyor 6' can discharge the balls onto a vibratory screen corresponding to screen 7 in FIGURES 1 and 2, which can act to deposit the balls larger than a predetermined size on the traveling grate of a pelletizing machine, such as the grate 8 of pelletizing machine 9 indicated in FIGURES 1 and 2.

Figure 15:
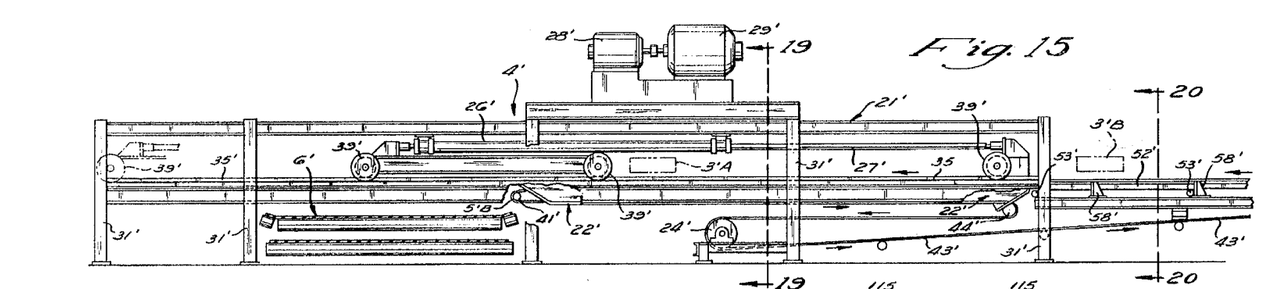
FIGURES 15 and 16 show, somewhat diagrammatically, a side elevation of another embodiment of the invention comprising an extensible conveyor having two extensible belts supported by a stationary frame and a single reciprocable carriage.

The apparatus of FIGURES 15 to 20 inclusive, comprises a stationary frame structure generally indicated by reference numeral 21' which supports the movable carriage 22' for horizontal reciprocatory movement, the carriage being shown in FIGURE 15 in full lines in its retracted position and in broken lines in its extended or advanced position. The frame structure 21' and the reciprocable movable carriage 22' cooperate to carry the pair of endless conveyor belts 23'A and 23'B in the desired side-by-side relation with corresponding parts of the adjacent conveyors at the same horizontal levels. Both of these belts are supported and arranged in such manner that as the movable carriage 22' reciprocates, the upper load-carrying run of each belt increases and decreases in length and their discharge ends 5'A and 5'B reciprocate transversely across the load carrying upper run of the conveyor 6'. Meanwhile, the length of the lower run of each belt 23'A and 23'B also changes to compensate for changes in the length of the upper run. The belts 23'A and 23'B are continuously positively driven by a common driving pulley 24' rotated by suitable power source such as a speed reducer 25' driven by a motor 20'. The reciprocable movable carriage 22' is positively moved between its extended and retracted positions by a hydraulic cylinder 26' having a double-ended piston rod 27' the opposite ends of which are connected to the opposite ends of the movable carriage 22' through dash pots 72'. The dash pots 72', the pistons therein, and their relationship to each other and to the piston rod 27' are like those described in connection with the corresponding parts in the previous embodiment. This hydraulic cylinder 26' is supplied with hydraulic fluid under pressure from a suitable source such as pump 28' operated by a motor 29'.

The upright side members 31' of stationary frame 21' rigidly support a pair of spaced parallel longitudinally and horizontally extending rails 35' on which the reciprocable carriage 22' travels. The carriage rotatably carries spaced double flanged wheels 39' which travel along the tracks 35'. In this case, however, the carriage 22' has two sets of rollers 39' near its forward end to support properly the long and relatively heavy carriage. Near its forward or discharge end, carriage 22' carries rollers 41' rotatable about a common horizontal axis extending at right angles to the direction of travel of the belts 23'A and 23'B and fixed relatively to the carriage so that the upper surfaces of the rollers 41' support the upper runs of the belts 23'A and 23'B and conduct such belts to their lower runs 43'.

Another pair of rollers 44' are rotatably supported at the rear end of carriage 22' about a common axis fixed on the carriage and parallel to the axis of rollers 41', and located so that the upper surface of each roller 44' supports the lower run of one of the belts and reverses it so it passes to the compensating portion of the lower run of the belt, as shown in FIGURE 15. The carriage 22' also carries suitable idler rollers, not shown, to support the upper and lower runs of the belts on the carriage. As shown in FIGURE 18, the rear ends of belts 23'A and 23'B respectively pass from the lower run to the upper run around end rollers 61'A and 61'B carried by or adjacent to the stationary frame. Preferably, as shown in FIGURE 16, each of these rollers acts as a tension roller to maintain the desired tension in the belt, as by being mounted on a horizontally movable carriage 63' which is biased by a cable 66' connected to a counterweight 71'.

As shown in FIGURES 15 and 16, each belt 23'A and 23'B thus has an upper run which is supported by movable carriage 22' and stationary frame 21' and which increases and decreases in length as the carriage reciprocates. Each has a lower run which extends between a roller 41' at the discharge end of the carriage and one of the end tension rollers 61'A or 61'B, and is looped around one of the rollers 44' on the rear of the carriage and around the drive roller 24' rotating about a fixed axis, so as to compensate for the change in length of the upper belt run as the carriage reciprocates. Each is positively driven by roller 24' during such reciprocation so its upper run moves toward its reciprocating discharge end, as shown by the arrows in FIGURES 15 to 18.

To support adequately the changing length of the upper run of each belt 23'A and 23'B between its rearmost tension pulley 61'A or 61'B and the rear of carriage 22', the illustrated apparatus includes a telescoping supporting means 51'A for a substantial length of the upper run of belt 23'A and a separate telescoping supporting means 51'B for a substantial length of the upper run of belt 23'B. As in the previous embodiment, and as shown to advantage in FIGURES 16 and 20, each supporting means comprises a generally channel-shaped movable supporting member 52' the forward end of which is fixed to the rear end of carriage 22' and the remainder of which is supported by rotatable rollers 53' carried by stationary frame 21'. Each of the telescoping supporting means also includes a stationary belt supporting member 56' mounted on stationary frame member 21' above the movable member 52' by brackets 58', belt supporting member 56' of telescoping supporting means 51'B being longer than that of means 51'A to carry the upper run of belt 23'B well past the end roller 61'A and its associated structure for belt 23'A. Idler rollers 47' carried by stationary frame 21' also support the portion of the upper run of belt 23'B between the rear of its supporting member 56' and its tension pulley 61'B. As the carriage 22' reciprocates each movable member 52' fixed to it reciprocates under its associated stationary member 56', thus providing a continuous extensible support for a substantial portion of each upper load-carrying run of the belt as it changes in length from movement of the carriage.

The means for controlling the reciprocation of the carriage may be similar to that previously described and hence requires no further discussion.

As shown in FIGURES 16 and 18, this embodiment also includes stop or baffle members 115 fixed to the frame 21' of the apparatus in the vicinity of the discharge locations of supply conveyor 3'C and 3'D to prevent overshooting of balls from these conveyors beyond the lateral limits of conveyor 23'B.

The path of travel of each extensible conveyor belt 23'A and 23'B is essentially similar to that of conveyor belt 23 of the previous embodiment in that, as the movable carriage reciprocates, the length of the upper run of each belt increases and decreases, the changing length of such upper run is adequately supported under load by telescoping supporting means, and the changes in length in the upper run are compensated for in the lower run. In this embodiment, moreover, the discharge ends of the upper runs of the belts are identically located relatively to the carriage since their end rollers rotate about a common axis. The overall operation of the apparatus in FIGURES 15 to 20 inclusive, is also generally similar to that of the preceding apparatus and provides substantially identical advantages, with the additional advantages that its capacity for carrying balls is substantially increased, being substantially double that of the previous embodiment if each of the belts 23'A and 23'B is of the same width as the belt 23 of the preceding embodiment. This substantial increase in capacity is achieved without increasing the thickness of the layer of the balls on the upper runs of the extensible belts, which is extremely important because substantial thickness in such layer could damage the balls which at this stage, fresh from the balling drums, are extremely fragile. Thus, a large capacity can be achieved without exceeding the optimum maximum thicknes of two balls.

Each of the belts 23'A and 23'B can be caused to discharge its layer of balls from its discharge end in the same manner as the conveyor 23 of the previous embodiment. For apparatus of given proportions, and depending on the continuous speed of the conveyor 6', continuous speed of conveyors 23'A and 23'B and the relative speeds of advance and retraction of the carriage 22', various patterns of layers or layer of balls can be deposited on the upper run of conveyor 6'. Thus, if the relative speeds of reciprocation of the extensible conveyors and the relative speeds of travel of the continuously moving receiving conveyor in the embodiment of FIGURES 15 to 20 are related as in the embodiment of the preceding figures, spaced ridges corresponding to the ridges 107 of FIGURE 3 can be obtained, each, however, of the ridges containing the balls from both conveyor belts 23'A and 23'B. Other patterns can be achieved by suitable adjustments of the speeds of travel of the conveyors. Similarly, by adjustments as indicated above in the preceding embodiment, various shapes, sizes and positions of the layer or layers deposited by conveyor 6' can be achieved.

While the invention has been discussed in connection with devices having one extensible belt, and two belts in side-by-side relation, devices embodying the invention may have more than two belts, and a plurality of belts in different relations.

Furthermore, while the invention has been described in connection with the manufacure of iron ore pellets on traveling-grate type pelletizing machines, in which it provides exceptional advantages, it may be employed to deposit these and other types of sinterable materials on or in traveling grates or other types of sintering machines. Apparatus embodying the invention may also be employed for purposes other than those specifically mentioned.

These and other modifications of the invention will be apparent to those skilled in the art. It is therefore to be understood that this patent is not limited to the preferred form of the invention disclosed herein, or in any other manner than by the scope of the appended claims.

We claim:

1. Apparatus for distributing loose flowable material comprising a stationary support; a carriage longitudinally reciprocably carried by said support; a roller, adapted to carry a belt, rotatably mounted on said carriage near one end thereof; a roller, adapted to carry a belt, rotatably mounted on the portion of said stationary support adjacent the other end of said carriage; an endless conveyor belt carried by said stationary support and said carriage so that its upper run, which is adapted to carry material, passes over said roller on said stationary support and said roller on said carriage; means for moving said belt so its upper run moves toward said roller on said carriage; an elongated fluid-operated cylinder mounted on said stationary support, said cylinder having projecting from each end thereof a carriage-actuating piston rod; and dash-pot means connecting each end of said piston rod to said carriage.

2. Apparatus for distributing loose flowable material comprising a stationary support; a carriage longitudinally reciprocably carried by said support; a roller, adapted to carry a belt, rotatably mounted on said carriage near one end thereof; a roller, adapted to carry a belt, rotatably mounted on the portion of said stationary support adjacent the other end of said carriage; an endless conveyor belt carried by said support and said carriage so that its upper run, which is adapted to carry material, passes over said roller on said stationary support and said roller on said carriage; means for moving the belt so its upper run moves toward said roller on said carriage; an elongated fluid-operated cylinder mounted on said stationary support, said cylinder having projecting from each end thereof a carriage-actuating piston rod; and, at each end of said actuating rod, a dash-pot comprising a cylinder member connected to said carriage and a piston slidably mounted in said cylinder member and connected to the adjacent end of said actuating piston rod, said parts being arranged so that each end of said actuating piston rod can exert only a tension force, and cannot exert a pushing force, on said carriage to move it.

3. Apparatus for distributing loose flowable material comprising a stationary support; a carriage longitudinally reciprocably carried by said support; a roller, adapted to carry a belt, rotatably mounted on said carriage near one end thereof; a roller, adapted to carry a belt, rotatably mounted on the portion of said stationary support adjacent the other end of said carriage; an endless conveyor belt carried by said support and said carriage so that its upper run, which is adapted to carry material, passes over said roller on said stationary support and said roller on said carriage; means for moving the belt so its upper run moves toward said roller on said carriage; an elongated fluid-operated cylinder mounted on said stationary support, said cylinder having projecting from each end thereof a carriage-actuating piston rod; and, at each end of said actuating piston rod, a dash-pot comprising a cylinder member connected to said carriage and having a cylinder chamber in which is slidably mounted a piston connected to the adjacent end of said actuating piston rod, said parts being arranged so that said actuating piston rod can exert only a tension force, and cannot exert a pushing force, on said carriage to move it, each of said dash-pots having a conduit connecting the opposite ends of said cylinder chamber, and an adjustable valve in said conduit to control adjustably the flow of fluid through said conduit from one end of the cylinder chamber to the other whereby to adjust the acceleration forces to which said carriage is subjected at the end of its reciprocable stroke.

4. Apparatus for distributing loose flowable material comprising a stationary support; a carriage longitudinally reciprocably carried by said support and having a discharge portion; a roller, adapted to carry a belt, rotatably mounted at the discharge portion of said reciprocable carriage; a roller adapted to carry a belt, rotatably mounted on the portion of said stationary support adjacent the end of said carriage remote from its discharge portion; an endless conveyor belt carried by said stationary support and said carriage so that the upper run of said belt, which is adapted to carry material, passes over said roller on said stationary support and over and around said roller at the discharge portion of said carriage whereby when said carriage is reciprocated the length of said upper belt run increases and decreases; means for moving said belt so its upper run moves toward said roller at the discharge portion of said carriage; means for reciprocating said carriage; extensible means, carried by said stationary support and by the end of said carriage remote from its discharge end, for supporting a substantial portion of the length of the upper run of said belt extending between said roller on said stationary support and said carriage; an elongated fluid-operated cylinder mounted on said stationary support, said cylinder having projecting from each end thereof a carriage-actuating piston rod; and at each end of said actuating piston rod, a dash-pot comprising a cylinder member connected to said carriage having a cylinder chamber in which is slidably mounted a piston connected to the adjacent end of said actuating piston rod, said parts being so related that said actuating piston rod can exert only a tension force and cannot exert a pushing force on said carriage to move it, each of said dash-pots also including a conduit connecting the opposite ends of said cylinder chamber and an adjustable valve in said conduit to control adjustably the flow of fluid between the ends of said dash-pot cylinder chamber.

5. Apparatus for distributing loose flowable material comprising a stationary support, a carriage longitudinally reciprocably carried by said support and having a discharge portion; a roller, adapted to carry a belt, rotatably mounted at the discharge portion of said reciprocable carriage; a roller, adapted to carry and drive a belt, rotatably mounted on said stationary support adjacent the end of said carriage remote from its discharge portion; a first endless conveyor belt carried by said stationary support and said carriage so that the upper run of said belt, which is adapted to carry material, passes over said roller on said stationary support and over and around said roller at the discharge portion of said carriage whereby when said carriage is reciprocated the length of said upper belt run increases and decreases; means for moving said belt so its upper run moves toward said roller at the discharge portion of said conveyor; extensible means carried by said stationary support and said carriage remote from its discharge portion, for supporting a substantial portion of the length of the upper run of said belt extending between said roller on said stationary support and said carriage; an elongated fluid-operated cylinder mounted on said stationary support, said cylinder having projecting from each end thereof a carriage-actuating piston rod; a dash-pot at each end of said actuating piston rod, said dash-pot comprising a cylinder member connected to said carriage and having a cylinder chamber in which is slidably mounted a piston connected to the adjacent end of said actuating piston rod, said parts being so related that said actuating piston rod can exert only a tension force and no pushing force on said carriage to move it, each of said dash-pots also including a conduit connecting the opposite ends of said cylinder chamber, and an adjustable valve in said conduit to control adjustably the flow of fluid between the ends of said cylinder chamber; and a second endless conveyor belt having an upper run adapted to carry material and terminating in a discharge end, said conveyor belt being arranged so that its upper run moves in a direction extending substantially at right angles to and below the discharge end of said upper run of said first conveyor belt, so the discharge end of said first conveyor belt moves across the upper run of said second belt within the limits defined by the side edges of the upper run of said second conveyor belt.

6. Apparatus for depositing balls to be pelletized comprising a traveling grate for supporting and transporting balls to be pelletized, a movable belt positioned so its upper run travels generally parallel to the direction of travel of said traveling grate and so its discharge end is located at a level above said traveling grate and substantially perpendicular to the direction of travel of said traveling grate, means for depositing balls on the upper run of said belt in spaced layers that extend transversely of and non-perpendicularly to the direction of travel of said traveling grate, and means for driving said belt so its upper run moves toward its discharge end to cause the balls in said layers to discharge onto said traveling grate.

7. Apparatus for distributing loose flowable material comprising a stationary supporting member; a carriage member longitudinally reciprocably carried by said supporting member; a roller, adapted to carry a belt, rotatably mounted on said carriage member near one end thereof; a roller, adapted to carry a belt, rotatably mounted on the portion of said stationary supporting member adjacent the other end of said carriage member; an endless conveyor belt carried by said stationary supporting member and said carriage member so that its upper run, which is adapted to carry material, passes over said roller on said stationary supporting member and said roller on said carriage member; means for moving said belt so its upper run moves toward said roller on said carriage member; an elongated fluid-operated cylinder mounted on one of said members, said cylinder having projecting from each end thereof a piston rod movable relatively to said cylinder; and dash-pot means connecting each end of said piston rod to said other member.

8. Apparatus for distributing on a traveling grate balls of material to be pelletized comprising a first conveyor including a conveyor belt arranged with a ball-carrying upper belt run terminating in a discharge end and with a lower return belt run; means for driving said belt so that in its upper run it travels substantially continually toward its discharge end; means for reciprocating said discharge end of said belt so it moves in a path parallel to the direction of travel of said upper run to increase and decrease the length of said upper run while said belt in said uper run is moving toward its discharge end; a second conveyor having a ball-carrying run, said second conveyor being arranged so its ball-carrying run moves in a path extending transversely of and below the path of the discharge end of said upper run of said conveyor belt and so said discharge end of said belt of said first conveyor moves transversely above and across substantially the entire width of ball-carrying run of said second conveyor; means for substantially continually moving said ball-carrying run of said second conveyor, said means for driving said belt of said first conveyor, said means for reciprocating said discharge end of said belt, and said means for moving said ball-carrying run of said second conveyor being timed relative to each other so that when the discharge end of said belt of said first conveyor moves across said ball-carrying run of said second conveyor in one direction it lays down on said run of said second conveyor spaced substantially parallel layers of balls that extend substantially entirely across said run of said second conveyor transversely to the direction of travel of said run of said second conveyor; a traveling grate arranged to travel in a direction generally parallel to the direction of travel of said ball-carrying run of said second conveyor and below the location at which said run of said second conevyor discharges; inclined screening means located to receive at its higher portion balls from said second conveyor and to discharge from its lower portion balls onto said grate; and means for removing undersized balls from said screening means.

9. In apparatus of the character described, a stationary support; a carriage longitudinally reciprocably carried by said support; an endless conveyor belt carried by said stationary support and said carriage so that the upper run of said belt, which run is adapted to carry material, can move longitudinally of said belt on said stationary support and said carriage and so that when said carriage is reciprocated the length of said upper belt run can increase and decrease; means for moving said belt so its upper run moves on said support and said carriage; and means for reciprocating said carriage, said last named means including means for reducing deceleration and acceleration forces on said carriage at each end of the reciprocatory stroke of said carriage.

10. In apparatus of the character described, a stationary support; a carriage longitudinally reciprocably carried by said support; an endless conveyor belt carried by said stationary support and said carriage so that the upper run of said belt, which run is adapted to carry material, can move longitudinally of said belt on said stationary support and said carriage so that when said carriage is reciprocated the length of said upper belt run can increase and decrease; means for moving said belt so its upper run moves on said support and said carriage; and means for reciprocating said carriage, said means comprising an elongated fluid-operated cylinder having a piston rod extensible and retractable therein, and means connecting said cylinder and piston rod between said stationary support and said carriage to reciprocate said carriage, said connecting means including means for reducing deceleration and acceleration forces on said carriage at each end of the reciprocatory stroke of said carriage.

11. In apparatus of the character described, a stationary support; a carriage longitudinally reciprocably carried by said support; an endless conveyor belt carried by said stationary support and said carriage so that the upper run of said belt, which run is adapted to carry material, can move longitudinally of said belt along said stationary support and said carriage and so that when said carriage is reciprocated the length of said upper belt run can increase and decrease; means for moving said belt so its upper run moves on said support and said carriage; and means for reciprocating said carriage, said means including a fluid-operated cylinder mounted on said stationary support and having projecting from each end thereof a carriage-actuating piston rod, and shock-reducing means connecting each end of said piston rod to said carriage.

12. In apparatus of the character described, a stationary support; a carriage longitudinaly reciprocably carried by said support; an endless conveyor belt carried by said stationary support and said carriage so that the upper run of said belt, which run is adapted to carry material, can move longitudinally of said belt along said stationary support and said carriage and so that when said carriage is reciprocated the length of said upper belt run can increase and decrease; means for moving said belt so its upper run moves on said support and said carriage; and means for reciprocating said carriage, said means including a fluid-operated cylinder mounted on said stationary support and having projecting from each end thereof a carriage-actuating piston rod, and means connecting each end of said piston rod to said carriage so it can exert only a tension force, and cannot exert a pushing force, on said carriage to move it.

13. Apparatus for depositing loose flowable solid material comprising a generally horizontal moving support for receiving and transporting loose flowable solid material deposited thereon; another support for carrying loose flowable solid material to said horizontal moving support in a direction generally parallel to the direction of travel of said generally horizontal support and having an edge extending substantially perpendicular to the direction of travel of said generally horizontal support; and means for depositing loose flowable material on said other support in spaced layers that extend transversely of and non-perpendicularly to the direction of travel of said generally horizontal support.

14. Apparatus for depositing loose flowable solid material comprising a generally horizontal moving support for receiving and transporting loose flowable solid material deposited thereon; a belt having a movable upper run located so its upper run travels generally in the direction of travel of said generally horizontal moving support and having a discharge end that extends substantially perpendicular to the direction of travel of said upper belt run; means for depositing loose flowable material on said upper belt run in spaced layers that extend transversely of and non-perpendicular to the direction of travel of said upper belt run; and an intermediate support for receiving loose flowable solid material dropping from the discharge end of said upper belt run, for carrying said loose flowable material in a direction substantially parallel to the directions of travel of said upper belt run and said generally horizontal support, and for discharging said loose flowable solid material from said intermediate support onto said generally horizontal moving support over an edge that extends substantially perpendicular to the direction of travel of said generally horizontal moving support.

15. The apparatus of claim 14 in which said intermediate support is adapted to carry loose flowable solid material discharged thereon from said upper belt run to said generally horizontal moving support downwardly in an inclined path in a direction opposite and substantially parallel to the directions of travel of said upper belt run and said generally horizontal moving support.

16. Apparatus for distributing on a traveling grate balls of material to be pelletized comprising a first conveyor including a conveyor belt arranged with a ball-carrying upper belt run terminating in a discharge end and with a lower return belt run; means for driving said belt so that in its upper run it travels substantially continually toward its discharge end; means for reciprocating said discharge end of said belt so it moves in a path parallel to the direction of travel of said upper run to increase and decrease the length of said upper run while said belt in said upper run is moving toward its discharge end; a second conveyor having a ball-carrying run, said second conveyor being arranged so its ball-carrying run moves in a path extending transversely of and below the path of movement of the discharge end of said upper run of said conveyor belt; means for substantially continually moving said ball-carrying run of said second conveyor, said means for driving said belt of said first conveyor, said means for reciprocating said discharge end of said belt, and said means for moving said ball-carrying run of said second conveyor being timed relative to each other so that when the discharge end of said belt of said first conveyor moves transversely of the ball-carrying run of said second conveyor in one direction it lays down on said run of said second conveyor spaced substantially parallel layers of balls that extend transversely to the direction of travel of said run of said second conveyor; and a traveling grate arranged to travel in a direction generally parallel to the direction of travel of the discharge end of said ball-carrying run of said second conveyor and below the location at which said run of said second conveyor discharges.

17. Apparatus for distributing on a traveling grate balls of material to be pelletized comprising a first conveyor including a conveyor belt arranged with a ball-carrying upper belt run terminating in a discharge end and with a lower return belt run; means for driving said belt so that in its upper run it travels substantially continually toward its discharge end; means for reciprocating said discharge end of said belt so it moves in a path parallel to the direction of travel of said upper run to increase and decrease the length of said upper run while said belt in said upper run is moving toward its discharge end; a second conveyor having a ball-carrying run, said second conveyor being arranged so its ball-carrying run moves in a path extending transversely of and below the path of movement of the discharge end of said upper run of said conveyor belt; means for substantially continually moving said ball-carrying run of said second conveyor, said means for driving said belt of said first conveyor, said means for reciprocating said discharge end of said conveyor belt, and said means for moving said ball-carrying run of said second conveyor being timed relative to each other so that when the discharge end of said belt of said first conveyor moves transversely of the ball-carrying run of said second conveyor in one direction it lays down on said run of said second conveyor spaced substantially parallel layers of balls that extend transversely to the direction of travel of said run of said second conveyor; a travelling grate arranged to travel in a direction generally parallel to the direction of travel of the ball-carrying run of said second conveyor; and screening means for receiving balls from said second conveyor and discharging balls onto said grate.

References Cited by the Examiner

UNITED STATES PATENTS

| | | | |
|---|---|---|---|
| 1,041,439 | 10/12 | Dearborn | 198—139 |
| 1,888,308 | 11/32 | Coffaro | 198—84 |
| 2,466,386 | 4/49 | Curioni | 198—59 X |
| 2,576,217 | 11/51 | Eggleston | 198—139 |
| 2,757,782 | 8/56 | Davis | 198—86 |
| 2,821,469 | 1/58 | Davis | 266—21 X |
| 2,876,489 | 3/59 | McDowell et al. | 266—21 X |
| 2,895,818 | 7/59 | McDowell | 266—21 X |
| 2,946,468 | 7/60 | Hagen et al. | 198—102 X |
| 2,997,205 | 8/61 | Schuerger et al. | |
| 3,003,611 | 10/61 | Pelzer | 198—139 X |
| 3,106,280 | 10/63 | Baker | 198—139 X |

SAMUEL F. COLEMAN, *Primary Examiner.*

JULIUS E. WEST, WILLIAM B. LA BORDE, *Examiners.*